(12) United States Patent
Miura et al.

(10) Patent No.: US 7,147,563 B2
(45) Date of Patent: Dec. 12, 2006

(54) VIDEO GAME APPARATUS, METHOD AND RECORDING MEDIUM FOR OBTAINING DATA FROM A URL AS RANDOM NUMBERS

(75) Inventors: Masakazu Miura, Tokyo (JP); Takenao Sata, Tokyo (JP)

(73) Assignee: Sega Corporation, Tokyo (JP)

( * ) Notice: Subject to any disclaimer, the term of this patent is extended or adjusted under 35 U.S.C. 154(b) by 659 days.

(21) Appl. No.: 10/190,865

(22) Filed: Jul. 8, 2002

(65) Prior Publication Data

US 2003/0013529 A1    Jan. 16, 2003

(30) Foreign Application Priority Data

Jul. 10, 2001    (JP) .............................. 2001-209529

(51) Int. Cl.
G06F 17/00 (2006.01)
G06F 19/00 (2006.01)

(52) U.S. Cl. ...................... 463/42; 43/1; 43/40; 43/41; 43/43

(58) Field of Classification Search ............ 463/40–43, 463/1
See application file for complete search history.

(56) References Cited

U.S. PATENT DOCUMENTS

| | | | | |
|---|---|---|---|---|
| 5,043,887 A | * | 8/1991 | Richardson ................... | 463/19 |
| 5,707,288 A | * | 1/1998 | Stephens ...................... | 463/33 |
| 5,869,819 A | * | 2/1999 | Knowles et al. ............. | 235/375 |
| 5,923,006 A | * | 7/1999 | Nakamura ................... | 200/5 B |
| 5,923,306 A | * | 7/1999 | Smith et al. ................. | 345/2.2 |
| 5,964,660 A | * | 10/1999 | James et al. .................... | 463/1 |
| 6,009,458 A | * | 12/1999 | Hawkins et al. ............. | 709/203 |
| 6,012,984 A | * | 1/2000 | Roseman ...................... | 463/42 |
| 6,106,399 A | * | 8/2000 | Baker et al. ................. | 463/42 |
| 6,179,713 B1 | * | 1/2001 | James et al. .................. | 463/42 |
| 6,280,325 B1 | * | 8/2001 | Fisk ............................ | 463/19 |
| 6,322,450 B1 | * | 11/2001 | Nakano ........................ | 463/40 |
| 6,709,336 B1 | * | 3/2004 | Siegel et al. .................. | 463/43 |
| 6,716,103 B1 | * | 4/2004 | Eck et al. ..................... | 463/45 |
| 6,761,636 B1 | * | 7/2004 | Chung et al. ................. | 463/42 |
| 2001/0027130 A1 | * | 10/2001 | Namba et al. ................ | 463/42 |
| 2002/0002074 A1 | * | 1/2002 | White et al. .................. | 463/25 |
| 2002/0061780 A1 | * | 5/2002 | Matsuno et al. .............. | 463/42 |
| 2003/0134679 A1 | * | 7/2003 | Siegel et al. .................. | 463/43 |

OTHER PUBLICATIONS

Sony PlayStation Instruction Manual for Model SCPH-5501. Scanned Copy. [online] [retrieved on Jul. 18, 2005] Retrieved from The Game Manul Archive <URL: http://www.gamemanuals.net/>. Attaching PDF Print Out (5 pages).*

Madden NFL 99 for Sony PlayStation: Instruction Manual. Scanned Copy. [online] [retrieved on Jul. 18, 2005] Retrieved from The Game Manul Archive <URL: http://www.gamemanuals.net/>. Attaching PDF Print Out (6 pages).*

Monster Rancher for Sony PlayStation: Instruction Manual. Monster Rancher, Released Nov. 15, 1997 in US. Scanned Copy. [online] [retrieved Mar. 27, 2006] Retrieved from: The Game Manual Archive <URL:http://www.gamemanuals.net/>. Attaching Print Out (14 pages).*

* cited by examiner

Primary Examiner—Scott Jones
Assistant Examiner—Milap Shah

(57) ABSTRACT

A video game apparatus, which generates, based on data obtained by a communication part via a server on a network, game data for causing a game to proceed, includes a control part converting the data obtained from the server on the network into one of a numeric value and a character code string and changing the game data based on the one of the numeric value and the character code string.

23 Claims, 10 Drawing Sheets

VIDEO GAME APPARATUS, METHOD AND RECORDING MEDIUM FOR OBTAINING DATA FROM A URL AS RANDOM NUMBERS

BACKGROUND OF THE INVENTION

1. Field of the Invention

The present invention generally relates to video game apparatuses, methods of obtaining data, and recording media, and more particularly to a video game apparatus that transmits and receives data through a server on a network, a method of obtaining data for such a video game apparatus, and a recording medium storing a program for causing a computer to execute such a method.

2. Description of the Related Art

In video game apparatuses, in the case of changing, with the progress of the story of a game, types of game characters appearing on the scene, directions in which a main character moves, or the belongings of the main character, the parameters of each character are selected at random by using numeric data so that the story of the game may be different each time.

In such a case of selecting parameters in a video game, for instance, the numeric data is obtained from TOC (table of contents) information recorded on a barcode or a CD-ROM, and the parameters of the characters are created by using the numeric data. Thereby, the natures and types of the characters (that is, appearing characters including monsters), game scenes, or the items of the main character are changed based on the parameters, so that a game player can enjoy a different story each time.

According to the above-described method of obtaining the numeric data from the TOC information recorded on the barcode or the CD-ROM, however, only the same data can be obtained if the same barcode or CD-ROM is used, and therefore, it is difficult to change the parameters at random.

Further, in the case of obtaining the numeric data from the TOC information recorded on the CD-ROM, it is necessary to change CD-ROMs every time the numeric data is obtained, thus resulting in a complicated operation.

In the case of obtaining the numeric data by reading the barcode, it is necessary to prepare different barcodes. However, this has caused problems because some people cut off barcodes from products on store shelves and others purchase products only for barcodes and discard the products themselves.

SUMMARY OF THE INVENTION

Accordingly, it is a general object of the present invention to provide a video game apparatus and a method of obtaining numeric data in which the above-described disadvantages are eliminated, and a recording medium storing a program for causing a computer to execute such a method.

A more specific object of the present invention is to provide a video game apparatus and a method of obtaining numeric data that can obtain numeric data as required at any time, and a recording medium storing a program for causing a computer to execute such a method.

The above objects of the present invention are achieved by a video game apparatus generating, based on data obtained by a communication part via a server on a network, game data for causing a game to proceed, the video game apparatus including a control part converting the data obtained from the server on the network into one of a numeric value and a character code string and changing the game data based on the one of the numeric value and the character code string.

According to the above-described video game apparatus, numeric data can be obtained as required at any time. Therefore, unlike in the case of generating numeric data by reading a barcode, there is no need to purchase unnecessary products for barcodes or cut off barcodes from products. Further, unlike in the case of generating numeric data from TOC information stored in a CD-ROM, no same character is selected. This makes the story of the game unpredictable so that the player can enjoy the game more.

The above objects of the present invention are also achieved by a method of obtaining game data for causing a game to proceed based on data obtained by a communication part via a server on a network, the method including the step of converting the data obtained from the server on the network into one of a numeric value and a character code string and changing the game data based on the one of the numeric value and the character code string.

According to the above-described method, the same effects as described above can be produced.

The above objects of the present invention are also achieved by a computer-readable recording medium storing a program for causing a computer to execute the step of converting data obtained from a server on a network into one of a numeric value and a character code string and changing game data for causing a game to proceed based on the one of the numeric value and the character code string.

The above objects of the present invention are further achieved by a computer-readable recording medium storing a program for causing a computer to execute the steps of (a) converting data obtained from a server on a network into one of a numeric value and a character code string; (b) updating a parameter for changing game data for causing a game to proceed based on the one of the numeric value and the character code string generated in said step (a); and (c) generating the game data based on the parameter updated in said step (b).

By causing a computer to read any of the above-described recording media, the same effects as described above can be produced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
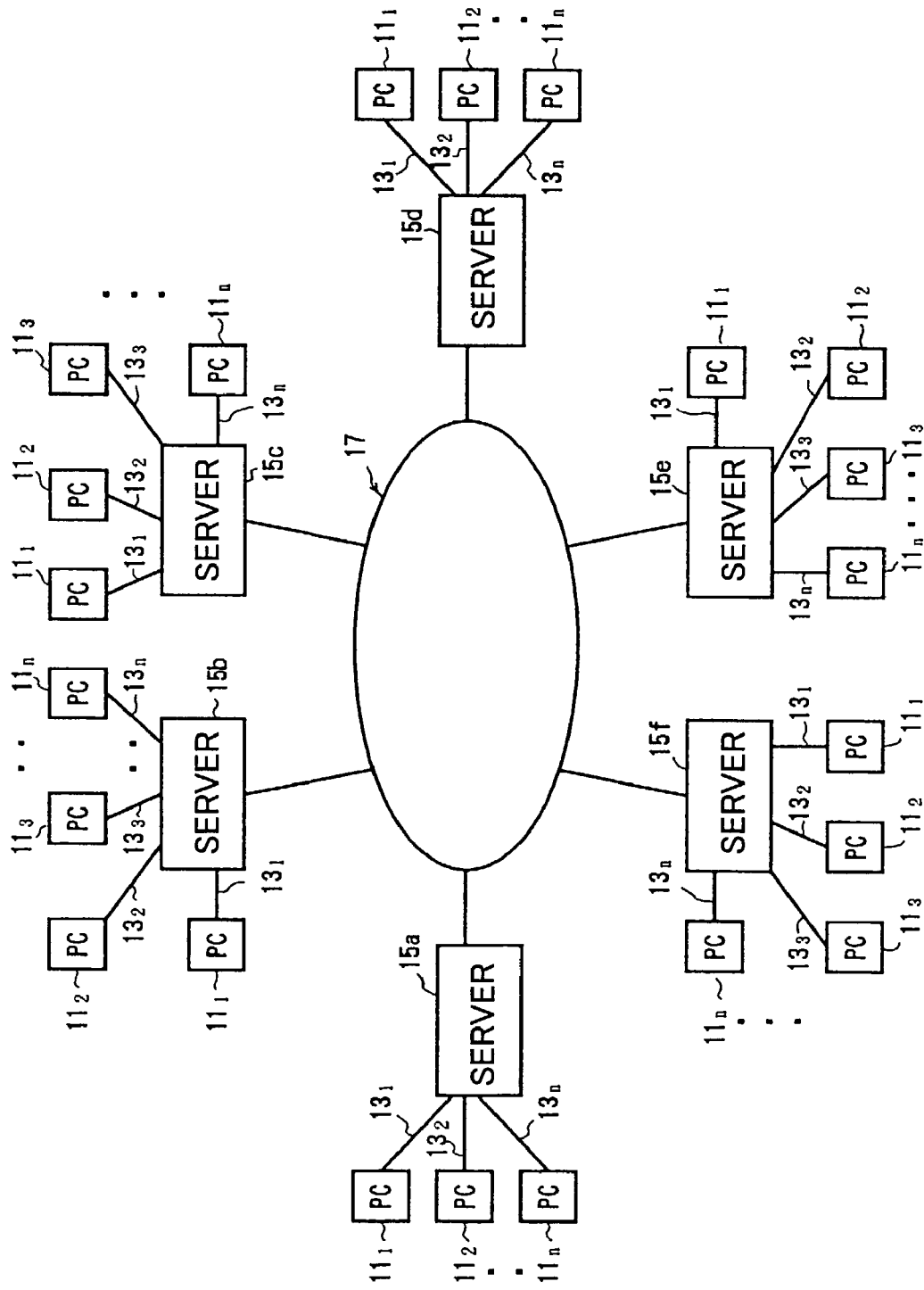
FIG. 1 is a schematic diagram showing a communication network to which video game apparatuses of the present invention are connected according to an embodiment of the present invention.
Figure 2:
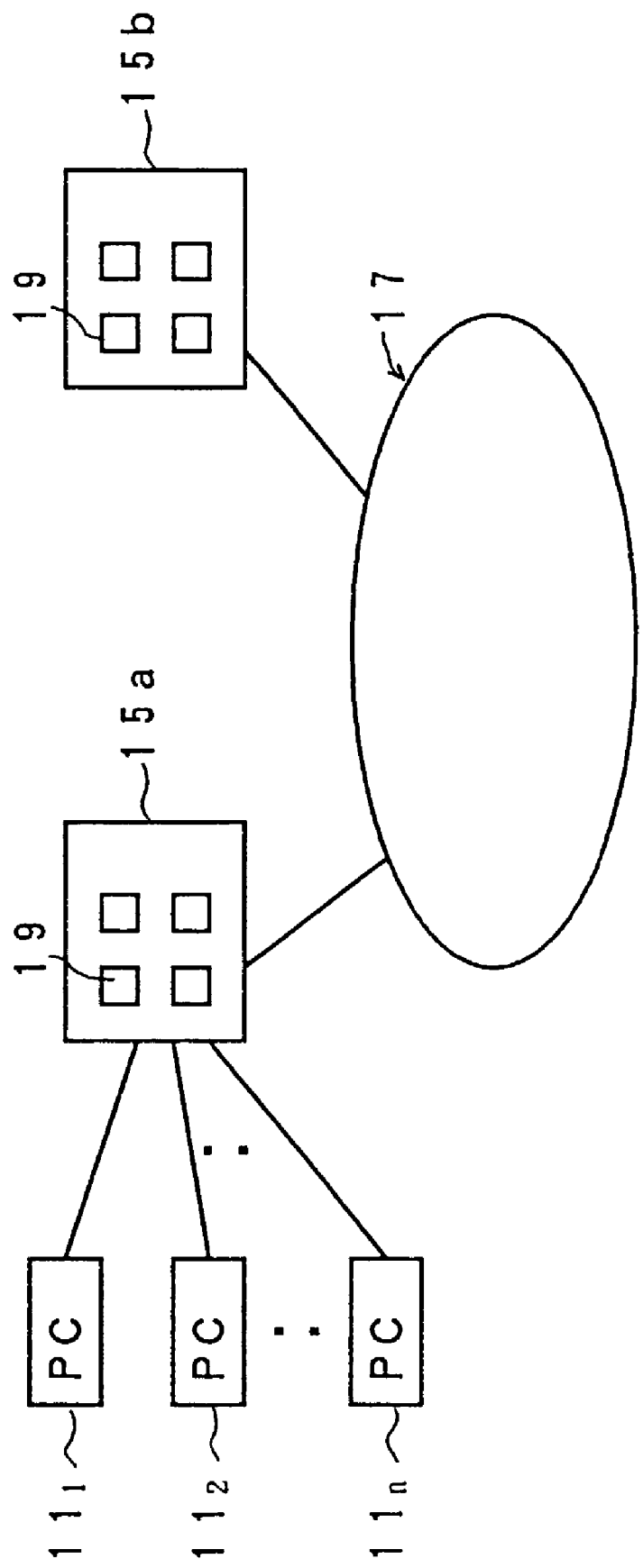
FIG. 2 is a schematic diagram showing Web sites opened on the Internet.

FIG. 1 is a schematic diagram showing a communication network to which video game apparatuses of the present invention are connected according to the embodiment of the present invention. FIG. 2 is a schematic diagram showing Web sites opened on the Internet.

As shown in FIG. 1, each of servers 15a through 15f of providers a through f has video game apparatuses 11$_1$ through 11$_n$ connected thereto via public lines 13$_1$ through 13$_n$, respectively. Thus, the video game apparatuses 11$_1$ through 11$_n$, which are provided in houses as client apparatuses and contain respective communication modems (later described in FIG. 4), are connected to a network 17 via the servers 15a through 15f so as to be able to communicate with one another.

As shown in FIG. 2, the video game apparatuses 11$_1$ through 11$_n$ are connected to a Web site 19 opened on the Internet via the corresponding servers 15a through 15f so as to be able to communicate with the Web site 19. For instance, when the video game apparatus 11$_1$ makes a request to the Web site 19 for communication, the server 15a of the provider a transmits image data, character data, or voice data recorded on the Web site 19 to a mail address entered by the transmitter, as will be described later.

Figure 3:
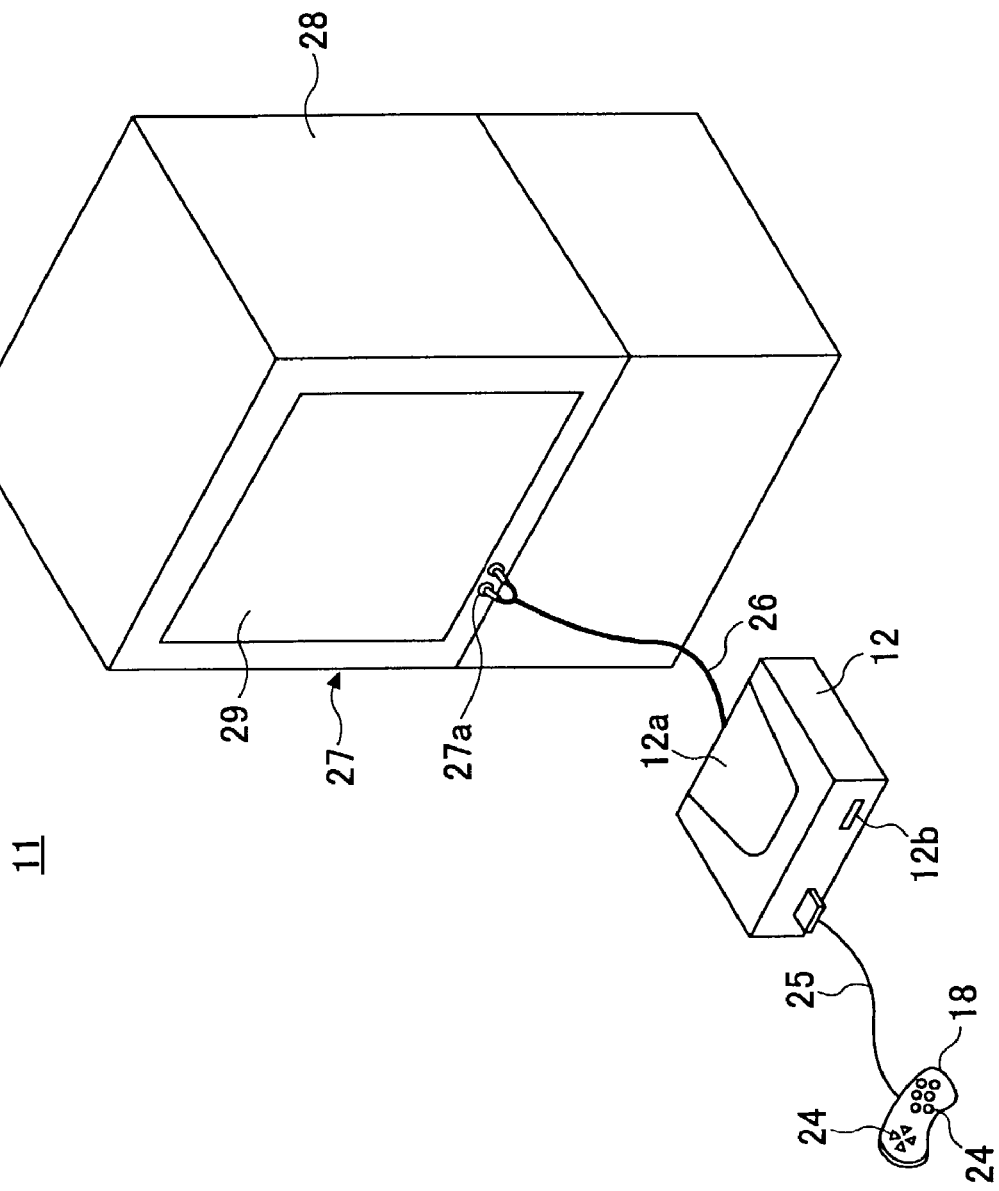
FIG. 3 is a perspective view of the video game apparatus of the present invention, showing a configuration thereof.

FIG. 3 is a perspective view of one of the video game apparatuses 11$_1$ through 11$_n$, showing a configuration thereof. Hereinafter, each of the video game apparatuses 11$_1$ through 11$_n$ is referred to as reference numeral 11 for convenience of description.

As shown in FIG. 3, the video game apparatus 11 includes a video game apparatus main body (hereinafter referred to as an apparatus main body) 12 and a controller 18 operated by a user (operator) as input means. The apparatus main body 12 reproduces data from a CD-ROM (not shown in the drawing) storing game software and outputs an image signal and a speech signal. A plurality of operation keys 24 are provided to the controller 18. When each operation key 24 is pressed down, the operation signal of the pressed operation key 24 is supplied to the apparatus main body 12 via a cable 25.

Instead of the above-described controller 18, a keyboard, a mouse, or a trackball may be used as input means. The video game apparatus 11 can display a game image by the image display function of the game software. Instead of the above-described video game apparatus 11, a terminal apparatus such as a personal computer or a cellular phone that can display a video game image may be used.

The apparatus main body 12 has a disk containing part 12a for containing the CD-ROM (not shown in the drawing) as a recording medium formed in its upper part, and a connector 12b to which the cable 25 is connected formed on its front side. The CD-ROM attached to the disk containing part 12a stores the video game software. Further, an optical pickup that optically reads minute pits formed on the recording surface of the CD-ROM is housed below the disk containing part 12a in the apparatus main body 12.

In this embodiment, the CD-ROM is employed as a recording medium recorded with game data. However, a recording medium such as a DVD (digital video disk), a hard disk device, or a ROM cartridge containing an IC memory may be employed instead of the CD-ROM.

The apparatus main body 12 is connected via a cable 26 to a television unit 27. The television unit is composed of a box-like housing 28 and a CRT display 29 incorporated therein. A connector hole 27a to which the cable 26 is connected is formed on the front side of the television unit 27.

In the case of playing a video game, the video game apparatus 11 and the apparatus main body 12 are turned on. Usually, the television unit 27 is of a home use type that displays images transmitted by radio waves, and therefore, the usual TV channel of the television unit 27 is switched to the video channel in the case of playing the video game. Thereby, the demonstration screen of the video game is displayed on the television unit 27. Thereafter, by pressing down one of the operation keys 24 provided to the controller 18 which one corresponds to a start button, the main part of the video game stored in the CD-ROM is started.

Figure 4:
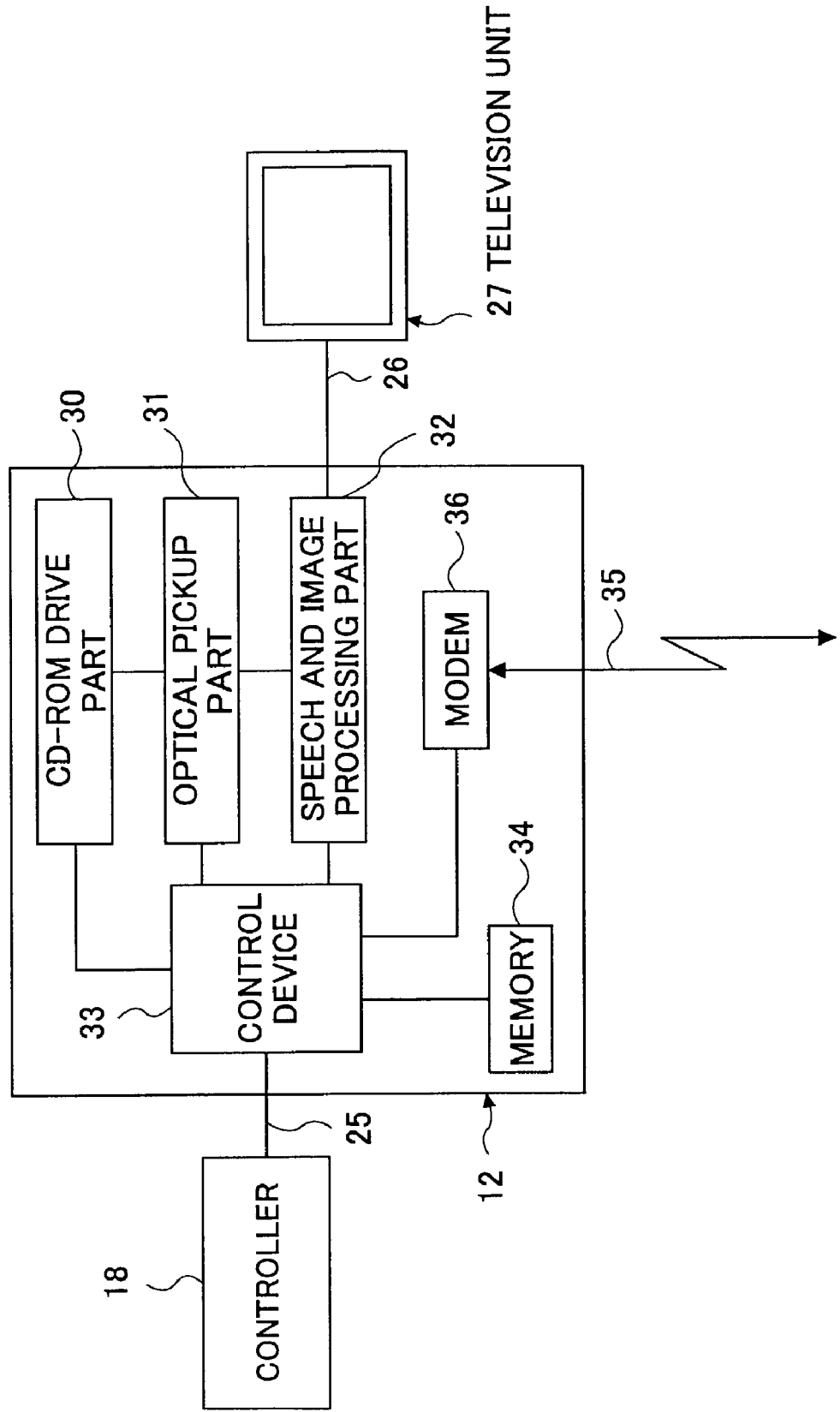
FIG. 4 is a block diagram showing the outline of the configuration of the video game apparatus of the present invention.

FIG. 4 is a block diagram showing the outline of the configuration of the video game apparatus 11.

As shown in FIG. 4, the apparatus main body 12 of the video game apparatus 11 includes a CD-ROM drive part 30, an optical pickup part 31, a speech and image processing part 32, a control device 33, and a memory (a storage part) 34. Accordingly, when the CD-ROM is attached to the CD-ROM drive part 30 and rotated, the optical pickup part 31 reads data recorded on the CD-ROM, and the read data is converted into speech and image signals by the speech and image processing part 32. The speech signal and the image signal are supplied to the television unit 27.

The memory 34 stores data files recorded with a variety of control programs and with data (for instance, a Web address on the Internet) obtained from the later-described server 15 (representing one of the above-described servers 15a through 15f) on the network 17. The control device 33 performs operations to generate video data based on the control programs stored in the memory 34. Further, the control device 33 converts at least one of the following data into a numeric value or a character code string: the address data of the server 15 on the network 17 and URL, file name, file format, the number of files, file size, the total number of characters in the file, a given character or word included in the file, and the number of given characters or words included in the file of accessed data. Based on the numeric (value) data or the character code string data, the control device 33 changes the parameters of the game software relating to game data so as to change the natures and types of characters as required. The game data includes the type, ability, external appearance, belongings, equipment, condition, and the number of appearances of a character appearing in the video game, and background images and their colors, music, and sound effects employed in the video game.

The apparatus main body 12 further includes a communication modem 36 connected via the public line 13 (representing a corresponding one of the public lines $13_1$ through $13_n$) to the network 17 (the Internet in this embodiment).

Here, a description will be given of a control operation performed by the control device 33 in the case of playing the video game using the apparatus main body 12.

Figure 5:
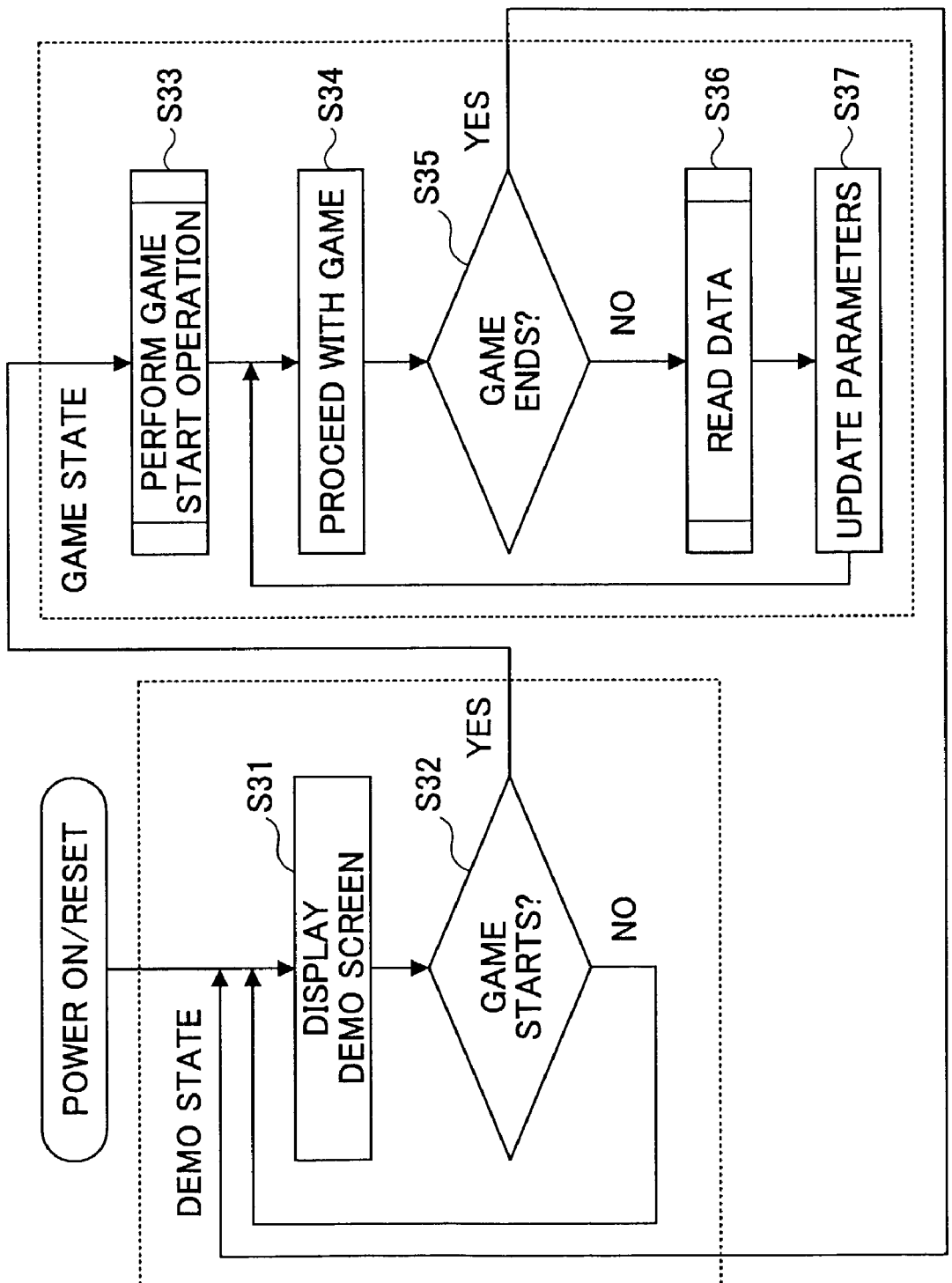
FIG. 5 is a flowchart for illustrating a main control operation performed by a control device of an apparatus main body of the video game apparatus of the present invention.

FIG. 5 is a flowchart for illustrating a main control operation performed by the control device 33 of the apparatus main body 12.

As shown in FIG. 5, when the apparatus main body 12 is turned on or the reset switch thereof is switched on, in step S31, the data stored in the CD-ROM attached to the disk containing part 12a of the apparatus main body 12 is read, so that the demonstration screen of the video game is displayed on the CRT display 29 of the television unit 27.

Next, in step S32, by pressing down the operation key 24 corresponding to the start button of the controller 18, the game is ready to be started. In step S33, the game start operation of the video game stored in the CD-ROM is executed, so that a start screen is displayed on the CRT display 29 of the television unit 27. A data file based on personal data entered by the user at the time of the game start operation is also created in step S33.

Next, in step S34, the user operates the operation keys 24 of the controller 18 to proceed with the video game. As the user proceeds with the video game, images corresponding to the operations of the user are displayed on the CRT display 29 of the television unit 27.

In step S35, it is determined whether the video game is terminated. If the video game is terminated due to, for instance, "game over", the operation returns to step S31 and step S31 and the following steps are repeated.

However, if it is determined in step S35 that the video game is not terminated, in step S36, data for creating parameters, such as numeric data or character code string data generated from a Web address on the Internet, as well as image and speech data are read from a data file stored in the memory 34. Next, in step S37, various parameters used in the video game are obtained based on the numeric data or the character code string data recorded in the data file, and parameters for changing the game data for advancing the video game are updated (parameter update means). Then, back in step S34, a character, for instance, is selected based on the updated parameters, and the user can proceed with the video game with the image data being changed so that the selected character appears.

The video game parameters changed by the generation of the numeric data or the character code string data include those changing the types and natures of a main character and its opponent characters such as persons, animals, and monsters, those of the performance and equipment of the items (belongings) of the main character and vehicles used by the main character, such as a motorbike, an automobile, a ship, an airplane, a submarine, and a spacecraft, and those of the backgrounds (road, river, mountain, bridge, castle, and maze) of places to which the main character moves and the weather conditions (sun, rain, wind, cloud, thunder, snow, and typhoon) of the places.

When the apparatus main body 12 is turned off, the control operation is suspended to stop outputting images and sound.

Next, a description will be given of a procedure for data communication (transmission and reception) between the video game apparatus 11 and the server 15 on the network 17.

Via the WWW (World Wide Web), the server 15 provides the video game apparatus 11 with information on the Internet, such as characters, images, and sound, through HTML (Hyper Text Markup Language) documents or URLs (Uniform Resource Locators). Further, in the video game apparatus 11, a Web browser (a software application used to search for and display Web pages) analyzes HTML data transmitted from the server 15 and displays the analyzed HTML data on the screen.

Figure 6:
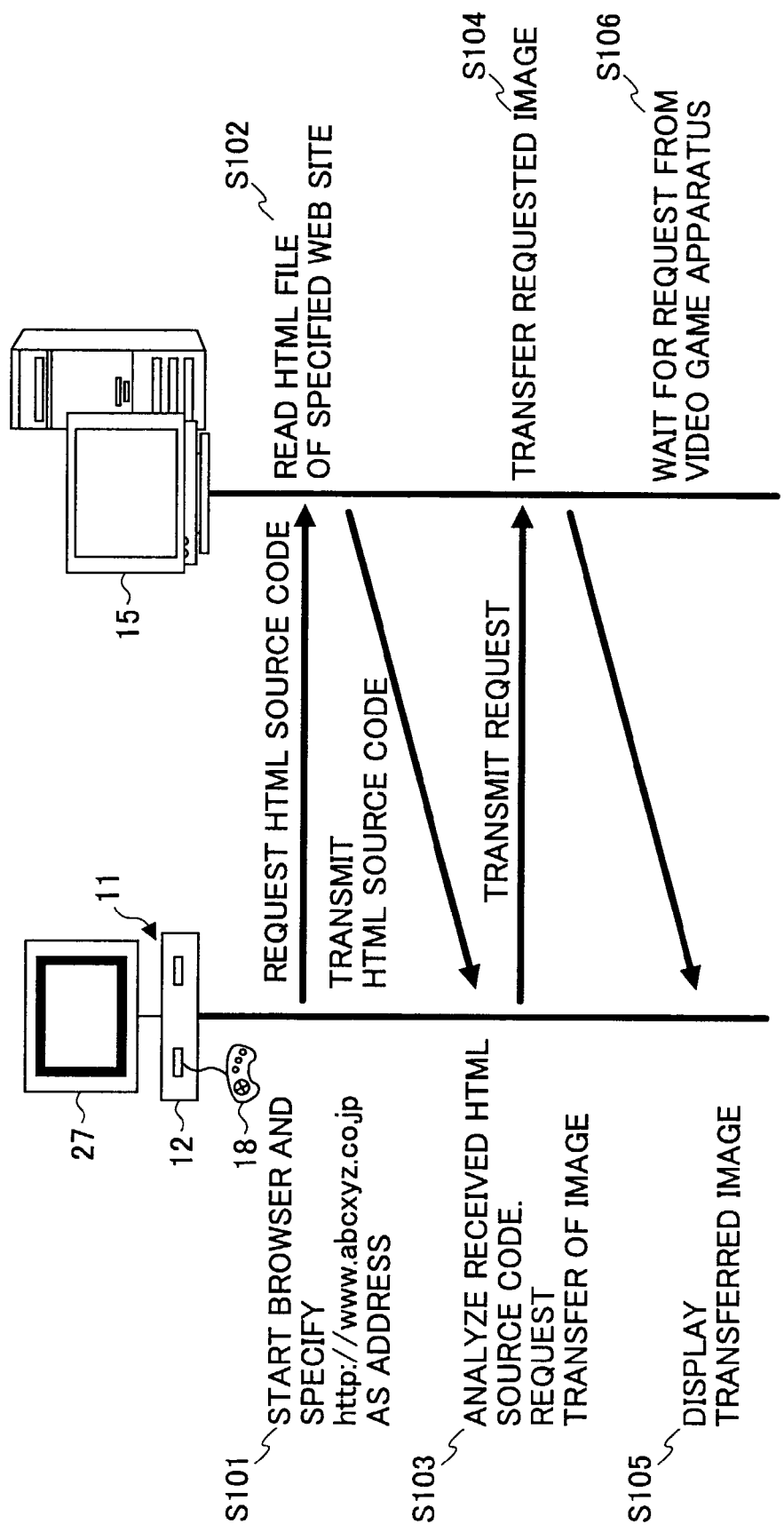
FIG. 6 is a schematic diagram showing a procedure for communication between the video game apparatus of the present invention and a server according to the embodiment of the present invention.

FIG. 6 is a schematic diagram showing a procedure for communication between the video game apparatus 11 and the server 15.

As shown in FIG. 6, in step S101, the video game apparatus 11, in accordance with the URL of a Web site specified by the user, requests the server 15 of a computer having the URL to transfer information such as an HTML source code to the video game apparatus 11.

In step S102, receiving the transfer request from the video game apparatus 11, the server 15 reads the HTML file of the specified Web site, and transfers the HTML source code of the Web site to the video game apparatus 11.

In step S103, receiving the HTML source code from the server 15, the video game apparatus 11 analyzes the HTML source code and displays the display part of the HTML source code on the CRT display 29 of the television unit 27. If link information on an image exists in the HTML source code, the video game apparatus 11 requests the server 15 to transfer the image.

In step S104, receiving the image transfer request from the video game apparatus 11, the server 15 transmits the information file of the request image to the video game apparatus 11.

In step S105, receiving the information file transferred from the server 15, the video game apparatus 11 displays the transferred image on the CRT display 29 of the television unit 27. While the user is viewing the displayed image, there is no information exchange between the video game apparatus 11 and the server 15.

In step S106, transferring the requested information, the server 15 remains in a wait state for a request from the video game apparatus 11.

Thus, the user operating the video game apparatus 11 can view the information of the Web site opened on the Internet.

Figure 7:
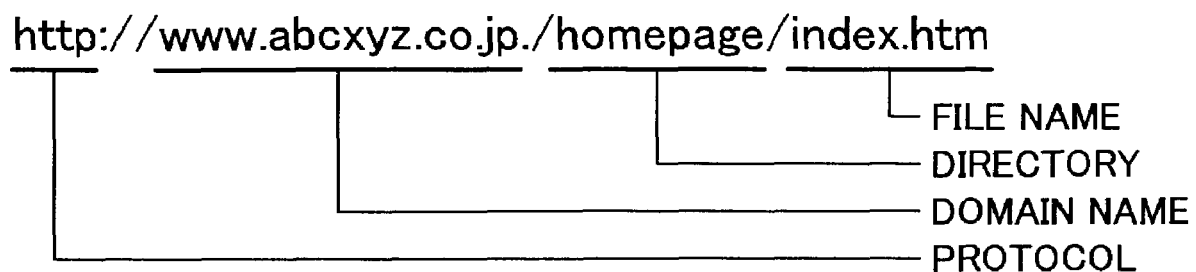
FIG. 7 is a diagram showing a URL configuration according to the embodiment of the present invention.

FIG. 7 is a diagram showing a URL configuration.

As shown in FIG. 7, the URL is information for specifying the location of a Web site on the Internet, and is expressed by character data such as "http://abcxyz.co.jp/homepage/index.htm".

In the above-described URL, "http" indicates that HTTP (Hypertext Transfer Protocol, a communication protocol) is used to search for the address of the Web site, "abcxyz.co.jp" is a domain name assigned to each video game apparatus 11 by DNS (Domain Name System) and is composed of host name, organization name, organization code, and country code, "homepage" is a directory (file folder) and may be different for each file, and "index.htm" is a file name provided for each file.

There are also protocols other than HTTP, such as HTTPS (Hypertext Transfer Protocol Secure), "file" (for a file on the network or a local file), FTP (File Transfer Protocol), "gopher" (for a Gopher file), "Telnet" (for access to a Telnet server), NNTP (Network News Transfer Protocol), and "Mailto" (for an e-mail address).

The URL configuration of FIG. 7 shows that the "index.htm" file in the "homepage" directory on the WWW server "abcxyz.co.jp" is accessed by HTTP.

Next, a description will be given of a control operation of generating numeric data or character code string data at random based on the above-described network address in order to change (or update) parameters in the game software.

Figure 8:
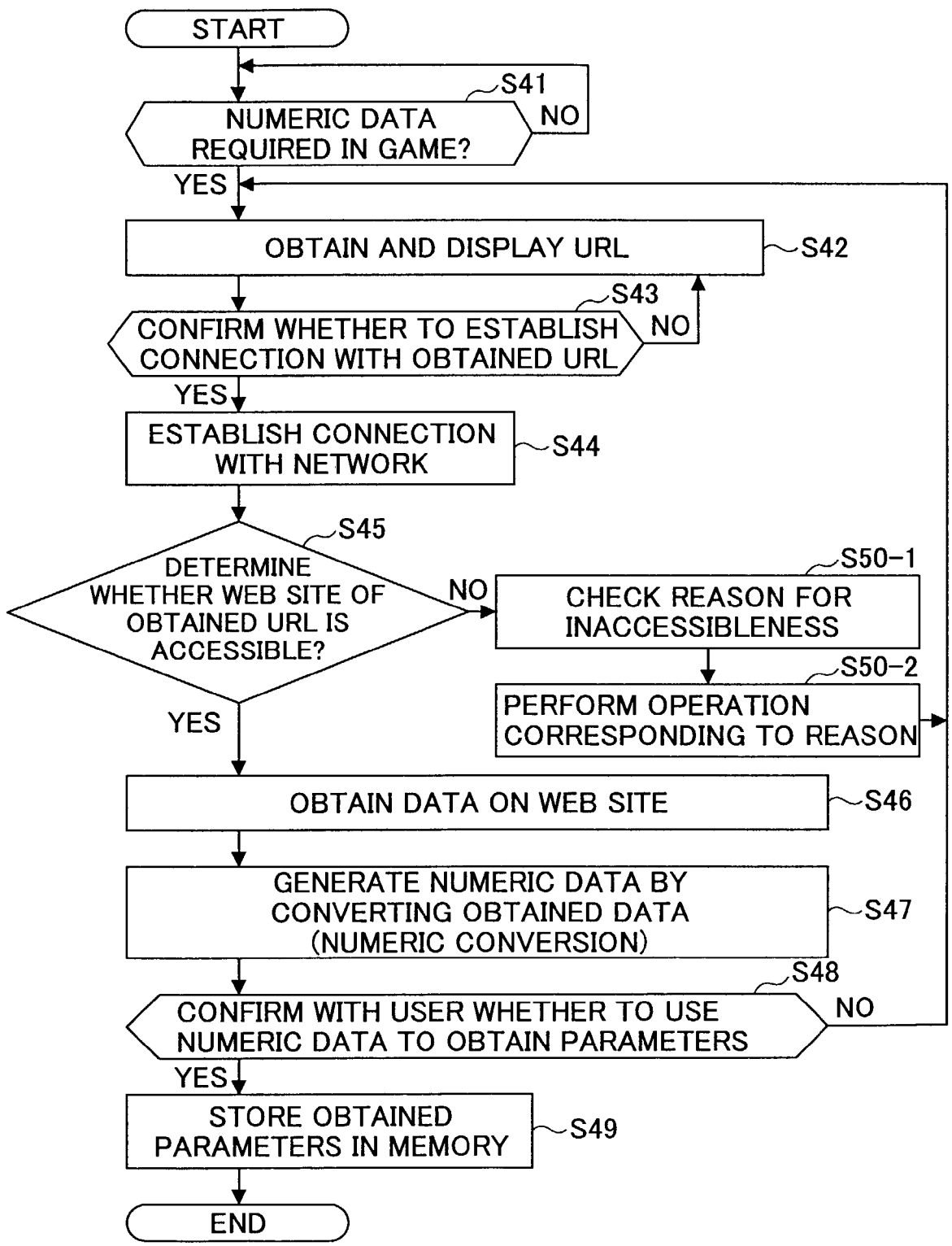
FIG. 8 is a flowchart for illustrating an interruption operation for generating numeric data (data conversion means) performed by the control device of the video game apparatus of the present invention.

FIG. 8 is a flowchart for illustrating an interruption operation for generating numeric data (data conversion means) performed by the control device 33 of the video game apparatus 11.

As shown in FIG. 8, in step S41, the control device 33 of the video game apparatus 11 determines whether numeric or character code string data is required in the video game.

If it is determined in step S41 that random numeric or character code string data is required, for instance, in a character selection (creation) mode, in step S42, the control device 33 obtains a URL (URL data, see FIG. 7) recorded in a data file of the memory 34, and displays the URL on the CRT display 29 of the television unit 27.

In the case of obtaining a URL, the user may enter any URL, or the control device 33 may obtain one of the URLs recorded in the data files of the memory 34. In the case of obtaining one of the URLs from the data files of the memory 34, the URL of, for instance, the last-accessed Web site, the oldest Web site in the access history, the most-accessed Web site, the least-accessed Web site, or a randomly selected one of the Web sites accessed in the past may be selected.

Next, in step S43, the control device 33 confirms with the user whether connection may be established with the URL obtained in step S42. If the user determines in step S43 that connection may be established with the URL obtained in step S42, in step S44, connection is established with the network 17. If the user determines in step S43 that connection may not be established with the URL obtained in step S42, step S42 is again performed to obtain a URL by a method different from that of the last time.

In step S45, it is determined whether the Web site on the network 17 is accessible based on the URL obtained in step S42. If it is determined in step S45 that the Web site is accessible, in step S46, data on the Web site of the URL is obtained. In addition to the URL, the data on the Web site includes site data (country to which the server belongs and provider name), a hierarchical structure beneath the URL (the number of hierarchies and the total number of files), HTML, image data (the presence or absence of data, file format, image size, and file size), and MIDI (Musical Instrument Digital Interface) data (the presence or absence of data, file format, and file size).

Next, in step S47, the control device 33 generates random numeric or character code string data by converting the data obtained from the Web site of the URL in step S46 (data conversion means). Then, in step S48, the control device 33 confirms with the user whether to obtain parameters in the video game software from the obtained numeric or character code string data by displaying the generation results thereof. If the user determines in step S48 that the numeric or character code string data obtained in step S47 is to be used, in step S49, the numeric or character code string data obtained this time is stored in the memory 34 as data for updating the parameters, and the numeric data generation operation of this time is terminated. However, if the user determines in step S48 that the numeric or character code string data obtained in step S47 is not to be used, the operation returns to step S42, and step S42 and the following steps are performed again.

If it is determined in step S45 that the Web site on the network 17 is not accessible with the URL obtained in step S42, in step S50-1, a reason for the inaccessibleness is checked. The Web site is inaccessible for one of reasons including the following: (a) the Web site does not exist, (b) the communication line is busy, and (c) a server on which the Web site is opened is not connectable because of maintenance.

Next, in step S50-2, the control device 33 performs an operation corresponding to the above-described reason for inaccessibleness. For instance, the control device 33 may (a) request that another URL be obtained, (b) read data on the Web site stored (cached) in the memory 34, or (c) establish connection to a predetermined Web site. In this embodiment, one of these operations (a) through (c) corresponding to the above-described reasons (a) through (c), respectively, is performed in step S50-2. Thereafter, the operation returns to step S42, and step S42 and the following steps are performed again.

Thus, the random numeric or character code string data is generated by converting the data obtained from the Web site of the obtained URL, and the parameters in the video game software are changed based on the generated numeric or character code string data. Therefore, a character that the user has not expected can be selected so that an unforeseen development may occur in the story of the video game.

Next, a description will be given of an operation of generating numeric or character code string data and selecting a character based on the generated numeric or character code string data.

Figure 9:
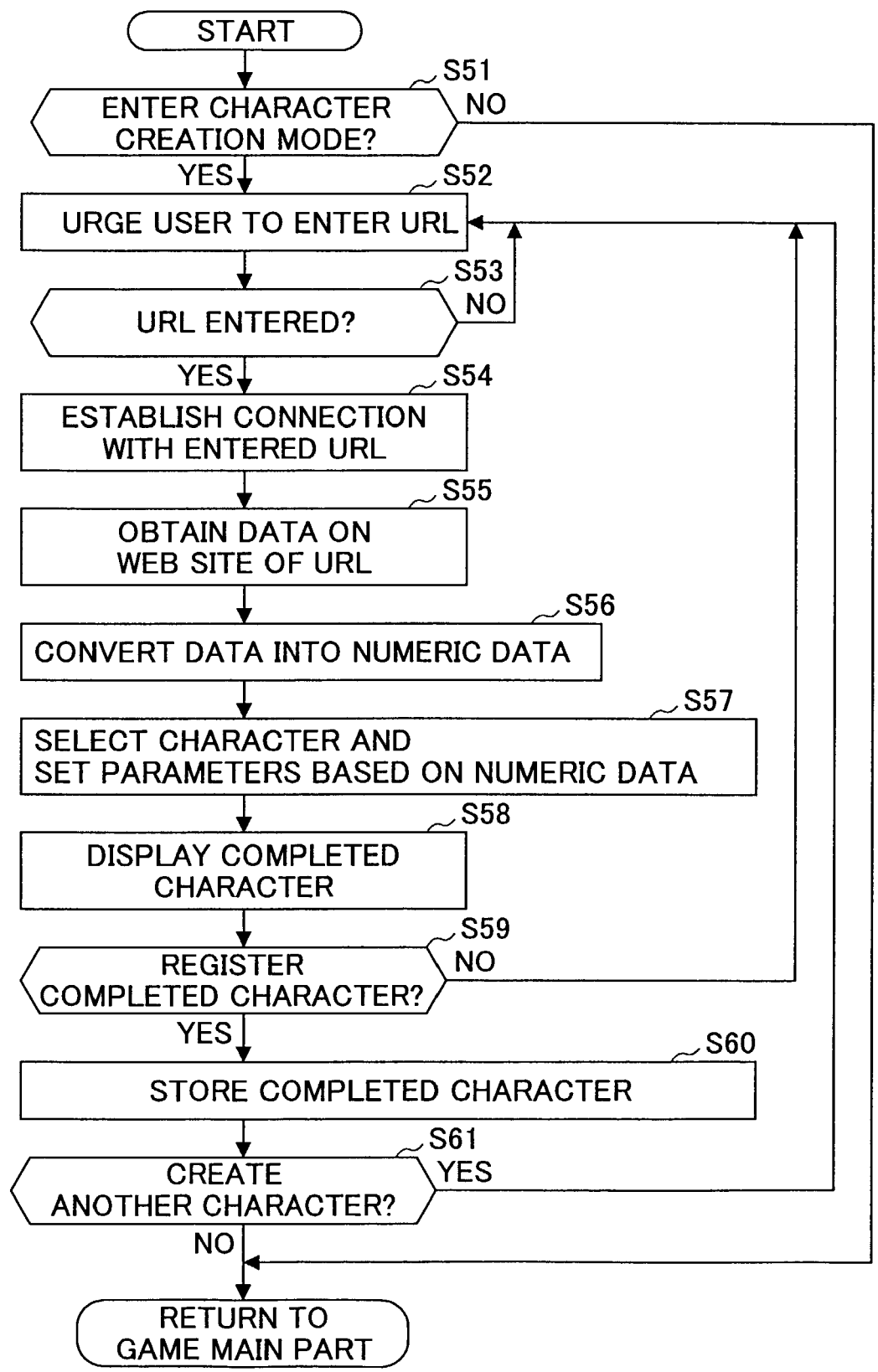
FIG. 9 is a flowchart for illustrating a character selection operation performed by the control device of the video game apparatus of the present invention.

FIG. 9 is a flowchart for illustrating a character selection operation performed by the control device 33 of the video game apparatus 11.

As shown in FIG. 9, in step S51, the control device 33 of the video game apparatus 11 determines whether the character creation mode requiring the numeric data is entered while the video game is being played. If it is determined that the character creation mode is not entered, this interruption operation is omitted and the main part of the video game proceeds. If it is determined in step S51 that the character creation mode is entered, however, in step S52, the user is notified of acquisition of a URL and is urged to input the URL. That is, in step S52, an input window and a list of bookmarks recorded in the data files of the memory 34 are displayed on the CRT display 29 of the television unit 27.

In step S53, it is determined whether or not any URL is input or selected from the list of the bookmarks. If it is determined in step S53 that a URL is input or selected from the list of the bookmarks, in step S54, the input URL (for instance, http//www.abcxyz.co.jp) is stored in a data file of the memory 34, and the URL is accessed for connection.

Next, in step S55, data on the Web site of the URL is obtained. The data on the Web site is composed of, for instance, data items 1 through 6 as indicated by (a) of FIG. 10.

Next, in step S56, random numeric values (numeric data) are obtained by converting the obtained data on the Web site. In this embodiment, as shown in (b) of FIG. 10, "http//www." and "co.jp", which are fixed parts, are excluded from the URL (for instance, http//www.abcxyz.co.jp).

Accordingly, in this embodiment, a character code string is extracted based on the domain name. For instance, a character code string of "61h, (=a), 62h (=b), 63h (=c), 70h (=x), 71h (=y), and 72h (=z)" is obtained from the domain name of "abcxyz.". This character code string is converted into numeric values used as the numeric data. The character code string may be obtained by expressing, in advance, the code numbers of a to z in hexadecimal numbers or by using an independently determined code.

Figure 10:
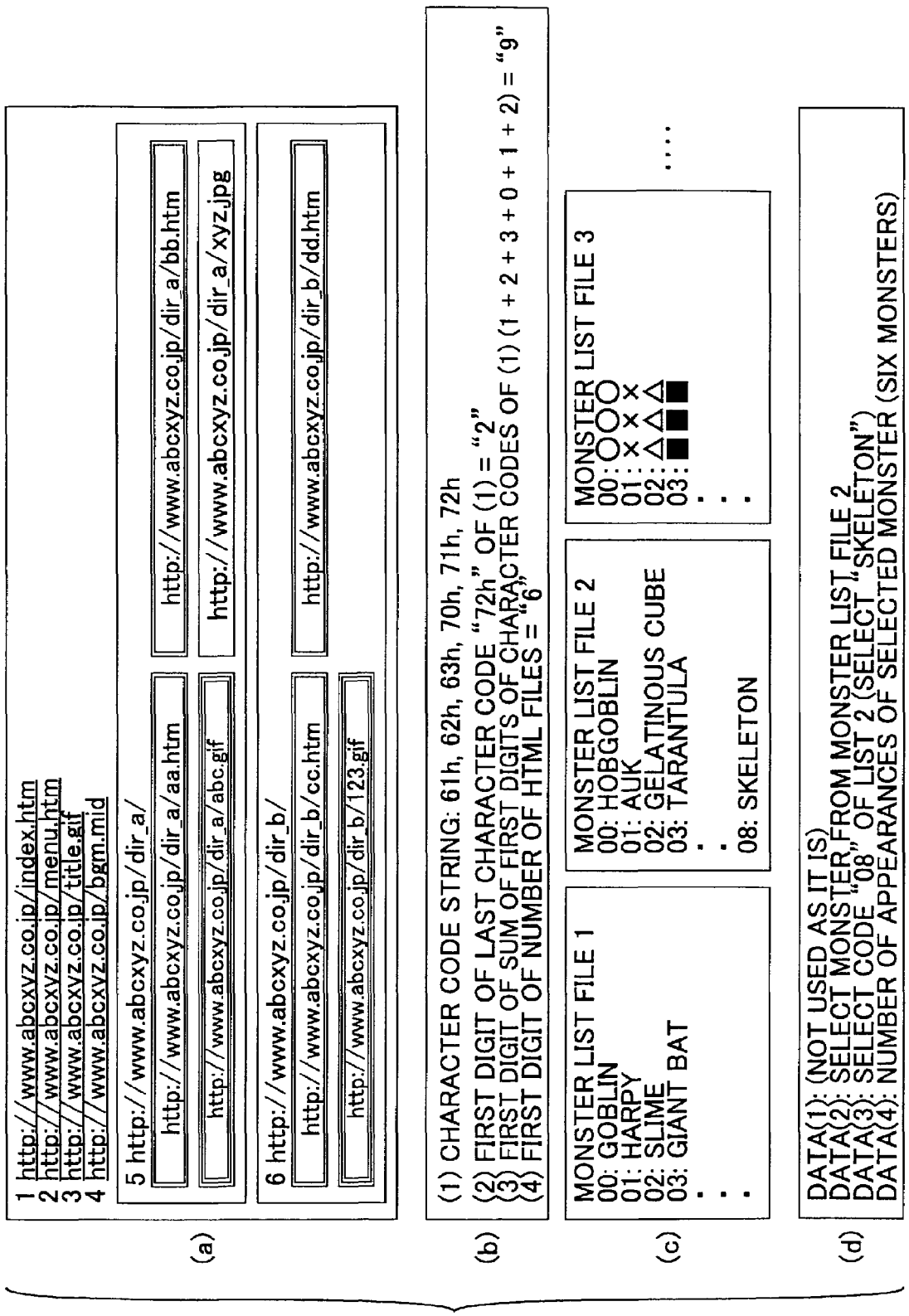
FIG. 10 is a diagram for illustrating the character selection operation performed by the control device of the video game apparatus of the present invention.

For instance, the value "2" of the first digit of the last character code "72h" of the above-described character code string corresponds to the number of a data file (for instance, the number ("2") of the monster list file 2 shown in (c) of FIG. 10). The sum of the values of the first digits of the character codes of the character code string, that is, "9" (=1+2+3+0+1+2), corresponds to the ordinal number of a character to be selected from the data file 2. That is, the ninth character "SKELETON" (indicating a type of monster) is selected. Further, the value "6" of the first digit of the number of HTML files is set as the number of appearing characters (the number of appearances of the selected monster) (see (d) of FIG. 10). Normally, one through nine monsters of the selected type can appear, or the selected monster can appear one through nine times. If the value of the first digit of the number of HTML files is zero, ten monsters of the selected type appear, or the selected monster appears ten times.

Next, in step S57, a character is selected based on the numeric values (numeric data) obtained in step S56, and parameters in the video game software are set based on the character code string. For instance, the parameter a of the items (belongings such as a sword, a rifle, and a flame gun) of the selected character is set based on the character code "61h". The parameter b of the color (for instance, red) of the selected character is set based on the character code "62h". The parameter c of the physical strength (for instance, an offense level) of the selected character is set based on the character code "63h". The parameter d of the physical agility (for instance, a moving velocity level) of the selected character is set based on the character code "70h". The parameter e of the defensive power (for instance, a physical endurance level) of the selected character is set based on the character code "71h". The parameter f of the nature (for instance, an offense-oriented and direct attack-oriented nature) of the selected character is set based on the character code "72h".

Next, in step S58, the character (monster) selected in step S57 is completed by adding the above-described parameters a through f thereto and is displayed. Next, in step S59, the control device 33 confirms with the user whether to register the completed character. If the user does not like the completed character and operates the controller 18 to enter "NO" in step S59, the operation returns to step S52 and step S52 and the following steps are performed again. At this point, a URL different from that of the last time is entered. Thereby, numeric or character code string data different from that of the last time is generated, so that a character different from the last one is selected.

Further, if the user is satisfied with the displayed completed character and operates the controller 18 to enter "YES" in step S59, data on the completed character and the parameters a through f are stored in the data file of the memory 34. The name and the date of creation of the completed character can also be recorded.

Next, in step S61, the control device 33 confirms with the user whether to create another character. If the user operates the controller 18 to enter "YES" in step S61, the operation returns to step S52 and step S52 and the following steps are performed again. At this point, a URL different from that of the last time is entered. Thereby, random numeric or character code string data different from that of the last time is generated, so that a character different from the last one is selected. If the user enters "NO" from the controller 18 in step S61, the character selection operation is terminated.

Thus, according to this embodiment, random numeric or character code string data is generated from a character code string obtained from any URL when the video game apparatus 11 is connected to the network 17. Therefore, unlike in the case of generating numeric data by reading a barcode, there is no need to purchase unnecessary products or cut off barcodes from products. Further, unlike in the case of generating numeric data from the TOC information recorded on the CD-ROM, the same character is prevented from being selected. In addition, according to this embodiment, the types or natures of a variety of characters appearing in the game, background, or sound effects can be changed each time with different conditions. This makes the game all the more amusing to the player.

In the above-described embodiment, only one of methods of obtaining numeric or character code string data from data obtained from the network 17 is described. In addition to the above-described method, the following methods are employable.

(A) In the case of using a URL:

(a) Numeric or character code string data is generated by counting the number of "." (dots) and/or "/" (slashes) included in the URL data.

(b) A country in which the server 15 is provided is identified from "com" or "jp" included in the URL and is used to generate numeric or character code string data. In generating an RPG (Role Playing Game) character, for instance, if the country in which the server 15 is provided is identified as Japan from "jp", the character is generated to have Japanese features and wear Japanese-style clothes and equipment.

(c) The character code string of a domain name included in the URL is obtained in any length, and the obtained length of the character code string is converted into a character code string, which is converted into numeric or character code string data.

(B) In the case of using HTML (a) Numeric or character code string data is generated by using a character code string that has a high possibility of being included in an HTML document. For instance, captured HTML data is searched for a given tag such as <dd>, <b>, or <ahref>, and the number of searched-out tags is employed as numeric data.

(b) In the case of managing the appearance of a monster by numeric data in an RPG, the numeric data may be generated by using the number of tags "<dd>" included in HTML data, the maximum number of characters included in one line in HTML data, or default values.

(c) For instance, if a tag "<table>" is used in an HTML document, a monster of a sorcerer type is selected. Alternatively, if a tag "<P>" is used in the HTML document, a monster of a flying type is selected. Further, if a tag "<ahref>" is not used in the HTML document, a monster of a dragon type is selected.

(d) The first digit of the data size of an HTML file is used as the number of appearances of a monster.

(e) If there are links to image files, a specific ability of a monster is determined by the number or format of image files. For instance, if the format of the image files is "gif", a bonus point corresponding to the number of image files is added to the usage rate of the deadly blow of the monster. Alternatively, if the format of the image files is "jpg", a bonus point corresponding to the number of image files is added to the power of sorcery of the monster. Further, if the number of image files is more than or equal to ten irrespective of their formats, the character (monster) has no specific ability.

(f) If HTML data includes a link to an image file, the format or size thereof is employed as numeric or character code string data. For instance, if the format of the image file is "jpg", the type of a character is determined to be a "human being". If the format of the image file is "gif", the type of a character is determined to be a "dwarf".

(g) If there are a plurality of image files of different formats ("jpg", "gif", etc.), the format used by the largest number of image files is employed, and the largest image file in size of the employed format is used.

(h) If a captured HTML file includes links to other locations (that is, tags "<ahref>"), one of the locations is jumped to at random so that numeric or character code string data is generated using the HTML file of the location.

In the above-described embodiment, the description is given of the case where the numeric or character code string data is obtained from the data obtained from the network 17 and the type or attribute of the monster is selected based on the obtained numeric or character code string data. The present invention, however, is applicable not only to the above-described case, but also to other game software programs.

A description will be given below of applications of the thus obtained numeric or character code string data to other games.

(a) Basically, the numeric or character code string data is applicable in any situation requiring numeric data in a game software program and a game apparatus.

(b) The numeric or character code string data is also applicable, for instance, in the case of changing data such as parameters related to the management of events or graphic sound during a game so that the contents of the game are varied to increase the interest of the user without losing the game balance (difficulty or operability of the game).

(c) The numeric or character code string data is also applicable to parameters for managing game halls in the RPG, such as a parameter for changing a winning rate in a casino, a parameter for changing a selection or the prices of weapons sold by a gun shop that a character drops by, and a parameter for changing the opening hours of a shop so that the shop is open during night and day or only at night.

(d) The numeric or character code string data is also applicable to parameters for changing the way a character talks, such as a parameter for changing the ends of words spoken by the character so as to change, for instance, honorific expression to casual talk, a parameter for changing a dialect or a language spoken by the character, and a parameter for changing the name of the character during conversation (for instance, characters come to call each other by their nicknames once the characters make friends with each other).

(e) The numeric or character code string data is also applicable in the case of changing backgrounds or ambient surroundings such as weather, seasons, transition of time in a day (from morning to noon to evening), small articles shown around (ornaments in a room or signboards), the contents of a title logo or a demonstration image, the design of a window frame, replays of an car racing game, events in an RPG, camera work at the time of sorcery effects, a map design in a dungeon RPG or a simulation game, a tune for background music, the tone of the tune, and the number of sounds.

(f) The numeric or character code string data is also applicable in the case of changing the way of thinking of an enemy character appearing during a game. That is, the numeric or character code string data is applicable, for instance, in the case of: a plurality of players taking part in the game and deciding which enemy starts attacking first and which player's character is attacked first by the enemy; changing the types or order of attacks (for instance, changing the order of attacks from "kick after punch" to "punch after kick" or changing the main method of attacks from "punch" to "sorcery"); changing the nature of a character (for instance, from offense-oriented to defense-oriented, from aggressive to passive, or from direct attack-oriented to indirect attack-oriented); changing the method or order of attacking enemy characters in a shooting game; and changing the pitching tendency of a pitcher in a baseball game (for instance, from fast ball-oriented to breaking ball-oriented).

(g) The numeric or character code string data is also applicable in the case of changing the deployment of an enemy. That is, the numeric or character code string data is applicable, for instance, in the case of: changing the order of appearances of enemies or stages and the combination of enemy stages in a shooting, action, or fighting game; changing the arrangement or order of appearances of a plurality of characters and the order of appearances of boss characters in a shooting game; changing the arrangement or types of traps in a dungeon RPG or an action game; and changing a map design in a dungeon RPG or an action or simulation game.

(h) The numeric or character code string data is also applicable in the case of changing time. That is, the numeric or character code string data is also applicable, for instance, in the case of: setting, in an event of "I will make a weapon, so come back again after a while" in an RPG, the period of "a while"; and setting the period of a specific attack by a boss character of a shooting game (for instance, how long the boss character continues a beam attack).

The present invention is not limited to the specifically disclosed embodiment, but variations and modifications may be made without departing from the scope of the present invention.

The present application is based on Japanese priority application No. 2001-209529 filed on Jul. 10, 2001, the entire contents of which are hereby incorporated by reference.

What is claimed is:

1. A video game apparatus generating, based on data obtained by a communication part via a server on a network, game data for causing a game to proceed, the video game apparatus comprising:

a control part determining the server based on one of a URL data item specified by a user and a randomly selected one of URL data items previously recorded in a memory, confirming whit the user whether to establish a connection with the obtained URL, converting data obtained from the server on the network into one of a numeric value and a character code string, and changing the game data at random to the game based on the one of the numeric value and the character code string, wherein the control part automatically performs a processor-initiated interruption operation initiated by execution of the game data to present the randomly selected one of URL data to the user for the user's confirmation.

2. The video game apparatus as claimed in claim 1, wherein the control part converts at least one item of the data obtained from the server into the one of the numeric value and the character code string, the data including address data of the server and a URL, a file name, a file format a number of files, a file size, a total number of characters in a file, a given character or word included in a file, and a number of given characters or words included in a file of accessed data.

3. The video game apparatus as claimed in claim 2, further including a television unit for displaying the video game data and a user controller unit for playing the game data, the control part displays a display menu from the server on the television unit and the player controller unit permits the user to select options from the display menu.

4. The video game apparatus as claimed in claim 3, wherein the game data relates to at least one of a type, an ability, an external appearance, belongings, equipment, a condition, and a number of appearances of a character appearing in the displayed video game, a background images, a color thereof, music, and sound effects, which can be selected from the display menu.

5. The video game apparatus as claims in claim 3, wherein the game data relates to a character for playing the video game, which is randomly selected by the control part and the parameters of the video game are changed based on at least one of the numeric value and character coda string.

6. The video game apparatus as claimed in claim 5, wherein the user with the user controller unit has the option of confirming the random selection of a character, wherein when the character is selected, the name and date of creation of a completed character is recorded by the control part.

7. The video game apparatus as claimed in claim 1, wherein the data obtained from the server is one of HTML, text, image, and speech data.

8. The video game apparatus as claimed in claim 1, wherein the game data relates to at least one of a type, an ability, an external appearance, belongings, equipment a condition, and a number of appearances of a character appearing in the game, a background image, a color thereof, music, and sound effects.

9. The video game apparatus as claimed in claim 8, wherein the character appearing in the game is operated based on a signal input from a controller operated by a player.

10. The video game apparatus as claimed in claim 1, wherein the control part determines whether the one of the numeric value and the character code string is required in the game, and determines the server if the control part determines that the one of the numeric value and the character code string is required in the game.

11. The video game apparatus as claimed in claim 10, wherein the control part determines at the interruption operation during the game whether the one of the numeric value and the character code string is required in the game.

12. The video game apparatus as claimed in claim 11, wherein the game data obtained from the one of the numeric value and the character code string is applicable to changing parameters related to the management of events required during a game so that the contents of the game are varied to increase the difficulty level and the interest of the user without losing the game balance.

13. The video game apparatus as claimed in claim 11, wherein the game data obtained from the one of the numeric value and the character code string is applicable to changing stage layouts, character speech patterns, and enemy strategies.

14. A method of obtaining game data for causing a game to proceed based on data obtained by a communication part via a server on a network, the method comprising the step of:
  storing a plurality of URL data items in a memory;
  automatically performing a processor-initiated interruption operation of the game to select one of the stored URL data items and displaying the related URL data item to the user;
  determining the server based on one of the URL data item specified by a user from the selected one of URL data items recorded in the memory;
  converting the data obtained from the server on the network into one of a numeric value and a character code string; and
  changing the game data at random to the game based on the one of the numeric value and the character code string,
  wherein the data obtained from the server is data on a Web site determined by the one of a URL data item specified by a user from the URL data items recorded in the memory.

15. The method as claimed in claim 14, wherein said converting step converts at least one item of the data obtained from the server into the one of the numeric value and the character code string, the data including address data of the server and a URL, a file name, a file format, a number of files, a file size, a total number of characters in a file, a given character or word included in a file, and a number of given characters or words included in a file of accessed data.

16. The method as claimed in claim 14, wherein the data obtained from the server is one of HTML, text, image, and speech data.

17. The method as claimed in claim 14, wherein the game data relates to at least one of a type, an ability, an external appearance, belongings, equipment, a condition, and a number of appearances of a character appearing in the game, a background image, a color thereof, music, and sound effects.

18. The method as claimed in claim 17, wherein the character appearing in the game is operated based on a signal input from a controller operated by a player.

19. A computer-readable recording medium storing a program for causing a computer to execute the step of:
  storing a plurality of URL data items in a memory;
  automatically performing a processor-initiated interruption operation of the game to select one of the stored URL data items and displaying the related URL data item to the user;
  determining the server based on one of the URL data item specified by a user from the selected one of URL data items recorded in the memory;
  converting the data obtained from the server on the network into one of a numeric value and a character code string; and
  changing the game data at random to the game based on the one of the numeric value and the character code string,
  wherein the data obtained from the server is data on a Web site determined by the one of a URL data item specified by a user from the URL data items recorded in the memory.

20. A computer-readable recording medium storing a program for causing a computer to execute the steps of:
  storing a plurality of URL data items in a memory;
  automatically performing a processor-initiated interruption operation of the game to select one of the stored URL data items and displaying the selected URL data items to the user;
  determining a server on a network based the URL data item specified by a user from the URL data items recorded in a memory;
  converting data obtained from the server on the network into one of a numeric value and a character code string;
  updating a parameter for changing game data at random to the game for causing a game to proceed based on the one of the numeric value and the character code string; and
  generating the game data based on the parameter updated.

21. A video game system comprising:

a source of video game data;

an audio and image processing unit to convert the video game data into audio signals and image signals;

an output device to provide audio and image display from the audio signals and image signals respectively to a user;

a modem that connects the video game system to the Internet;

a memory that stores URLs entered during operation of the video game system;

a control part for updating parameters of game play by using numerical data generated by connection to one of the stored URLs, the control part performing an interruption operation during execution of the video game data, obtaining the URL by randomly selecting a previously entered URL from the memory, and confirming with the user whether to establish a connection with the obtained URL to download HTML data;

an input device that allows the user to confirm whether to establish a connection with the obtained URL; and means for determining numerical data from the URL and corresponding HTML data.

22. The video game system of claim 21 where the means for determining numerical data from the URL converts the domain name of the URL into a character code string that is then converted into the numerical data.

23. The video game system of claim 21 where the means for determining numerical data from the URL captures the HTML data from the URL and converts the HTML data into the numerical data.

* * * * *